United States Patent
Kim et al.

(10) Patent No.: US 8,639,120 B2
(45) Date of Patent: Jan. 28, 2014

(54) METHOD AND SYSTEM FOR ELECTRICAL DOMAIN OPTICAL SPECTRUM SHAPING

(75) Inventors: Inwoong Kim, Allen, TX (US); Paparao Palacharla, Richardson, TX (US); Takao Naito, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 445 days.

(21) Appl. No.: 12/690,682

(22) Filed: Jan. 20, 2010

(65) Prior Publication Data

US 2011/0176813 A1    Jul. 21, 2011

(51) Int. Cl.
*H04J 14/02*    (2006.01)

(52) U.S. Cl.
USPC .............................. 398/82; 398/85; 398/149

(58) Field of Classification Search
USPC ................ 398/149, 160, 183–201, 82–85
See application file for complete search history.

(56) References Cited

U.S. PATENT DOCUMENTS

| | | | | |
|---|---|---|---|---|
| 6,118,566 A * | 9/2000 | Price | | 398/194 |
| 8,175,549 B2 * | 5/2012 | Faust et al. | | 455/91 |
| 2004/0223553 A1 * | 11/2004 | Kumar | | 375/259 |
| 2007/0211788 A1 * | 9/2007 | Fink et al. | | 375/146 |
| 2009/0238580 A1 * | 9/2009 | Kikuchi | | 398/192 |

* cited by examiner

*Primary Examiner* — Dzung Tran
(74) *Attorney, Agent, or Firm* — Baker Botts L.L.P.

(57) ABSTRACT

A system is provided for electrical domain optical spectrum shaping. The system may include a laser, a modulator, a first electrical filter, and a second electrical filter. The laser may be configured to output an optical carrier signal. The modulator may be configured to modulate the optical carrier signal to output a modulated optical signal based on a first filtered input signal and a second filtered input signal received by the modulator. The first electrical filter may be configured to filter a first input signal to produce the first filtered input signal. The second electrical filter may be configured to filter a second input signal to produce the second filtered input signal.

6 Claims, 2 Drawing Sheets

METHOD AND SYSTEM FOR ELECTRICAL DOMAIN OPTICAL SPECTRUM SHAPING

TECHNICAL FIELD OF THE INVENTION

The present invention relates generally to optical networks and, more particularly, to a method and system for shaping of optical signals in the electrical domain.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. An optical network may be configured to combine modulated signals at various wavelengths or optical frequencies (also known as "channels") into a single optical fiber. Each disparate channel may include optically encoded information to be communicated throughout the optical network.

A common problem in optical networks is that of "crosstalk" between the various channels. Crosstalk is a phenomenon by which a signal transmitted on one channel of an optical transmission system creates an undesired effect in another channel. For example, crosstalk may occur when side lobes of a signal for a first channel overlap with a portion of a second channel in the frequency domain.

SUMMARY

In accordance with a particular embodiment of the present disclosure, a system is provided for electrical domain optical shaping. The system may include a laser, a modulator, a first electrical filter, and a second electrical filter. The laser may be configured to output an optical carrier signal. The modulator may be configured to modulate the optical carrier signal to output a modulated optical signal based on a first filtered input signal and a second filtered input signal received by the modulator. The first electrical filter may be configured to filter a first input signal to produce the first filtered input signal. The second electrical filter may be configured to filter a second input signal to produce the second filtered input signal.

Technical advantages of one or more embodiments of the present invention may provide methods and systems for shaping of optical signals using electrical-domain filtering, thereby allowing for the elimination of optical filters present in traditional colorless networks.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1A:
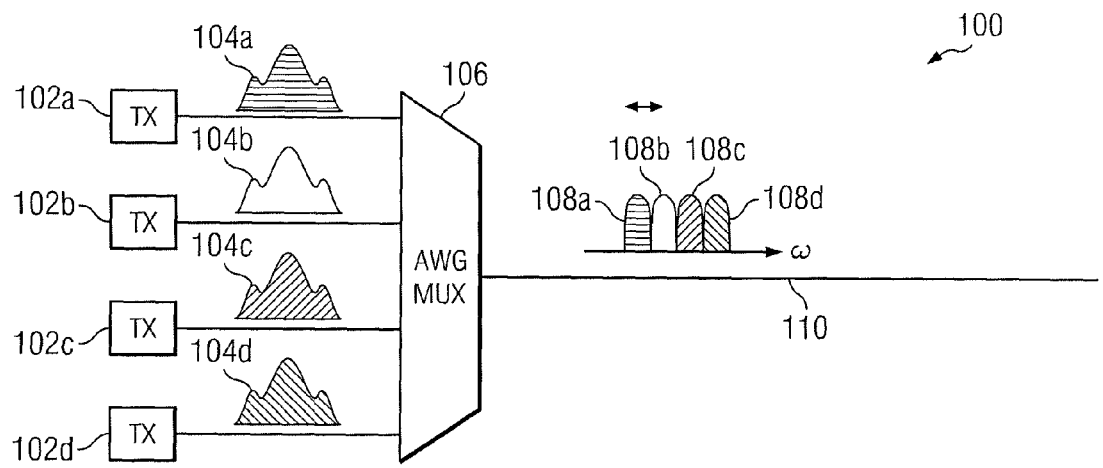
FIG. 1A illustrates a portion of an example optical node for colored add of signals in an optical network, in accordance with certain embodiments of the present disclosure.

In "colored" optical networks, crosstalk may be reduced through the use of arrayed waveguide grating (AWG) multiplexers. To illustrate, FIG. 1A illustrates a portion of an example optical node 100 for colored add of signals in an optical network, the optical node 100 having transmitters 102a-d (individually referred to as transmitter 102 and collectively referred to as transmitters 102), an AWG multiplexer 106, and a fiber 110. Each of transmitters 102a-102d may transmit a respective modulated optical signal 104a-104d (individually referred to as optical signal 104 and collectively referred to as optical signals 104) of a particular wavelength. The individual optical signals 104 may be combined into a multi-channel signal by AWG multiplexer 106 and communicated via fiber 110. As shown in FIG. 1A, AWG multiplexer 106 may also filter the individual optical signals 104 when it multiplexes (or combines) the various channels 108a-d of the multi-channel signal (e.g., AWG multiplexer 106 may filter or shape optical signals 104 such that side lobes of optical signals 104 are removed).

Figure 1B:
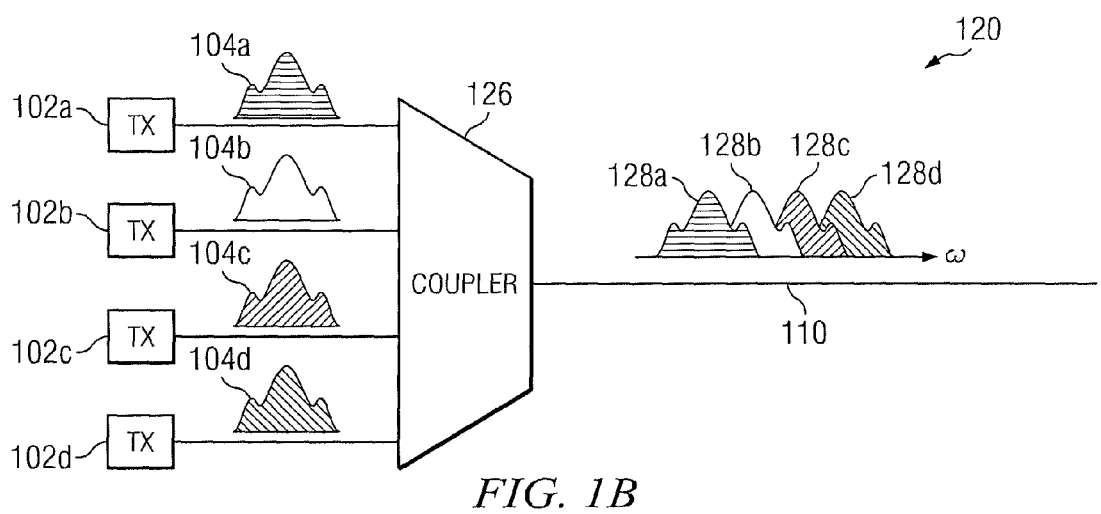
FIG. 1B illustrates a portion of an example optical node for colorless add of signals without signal shaping in an optical network, in accordance with certain embodiments of the present disclosure.

However, in "colorless" optical nodes, individual optical channels are often combined into a multi-channel signal by couplers (e.g., N×1 couplers) or wavelength selective switches (WSSs). Couplers are often not capable of shaping optical signals as are AWG multiplexers. Accordingly, multiplexing using a simple coupler in colorless optical nodes may often be more susceptible to crosstalk as compared to colored optical nodes, as illustrated by example optical node 120 of FIG. 1B. As in FIG. 1A, each of transmitters 102a-102d may transmit a respective modulated optical signal 104a-104d of a particular wavelength. Instead of being combined by an AWG multiplexer, optical signals 104 may be combined by coupler 126 (e.g., an N×1 coupler) and communicated via fiber 110. However, because coupler 126 does not provide optical shaping, side lobes of channels 128 may overlap with adjacent channels, thus inducing crosstalk among the channels 128.

Figure 1C:
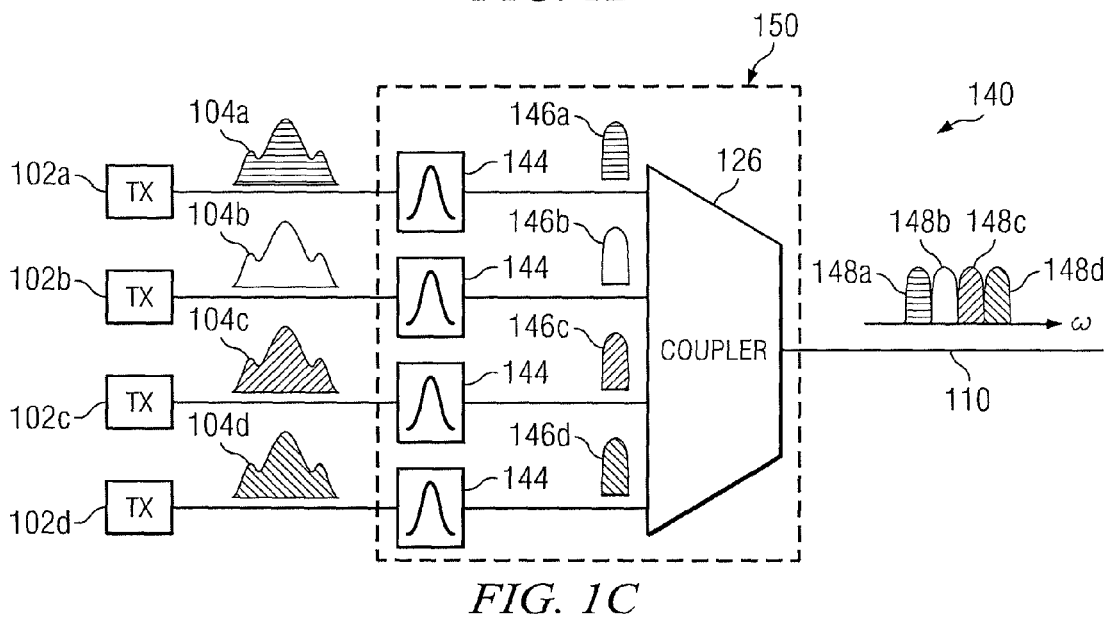
FIG. 1C illustrates a portion of an example optical node for colorless add of signals with signal shaping using a wavelength selective switch in an optical network, in accordance with certain embodiments of the present disclosure.

To reduce crosstalk in colorless nodes, tunable filters 144 are often interfaced between the individual transmitters 102 and coupler 126, as shown in example optical node 140 of FIG. 1C. In this example, wavelength selective switch (WSS) filter 150, functionally represented as comprising tunable filters 144 and a coupler 126, is used for signal shaping and multiplexing. As in FIGS. 1A and 1B, each of transmitters 102a-102d may transmit a respective modulated optical signal 104a-104d of a particular wavelength. Each optical signal 104 may be filtered by a corresponding tunable filter 144 to produce corresponding filtered optical signals 146a-d. Filtered optical signals 146a-d may be shaped such that side lobes or other undesirable characteristics are removed from optical signals 104. Filtered optical signals 146a-d may be combined by coupler 126 (e.g., an N×1 coupler) and communicated via fiber 110. As shown in FIG. 1C, the resulting multi-channel signal may have suppressed spectra between the various channels 148a-d as a result of the optical filtering performed by tunable filters 144, thus reducing the potential for crosstalk. However, the introduction of tunable filters 144 in WSS filter 150 adds undesirable cost in complexity to the optical domain of optical node 140.

Figure 2A:
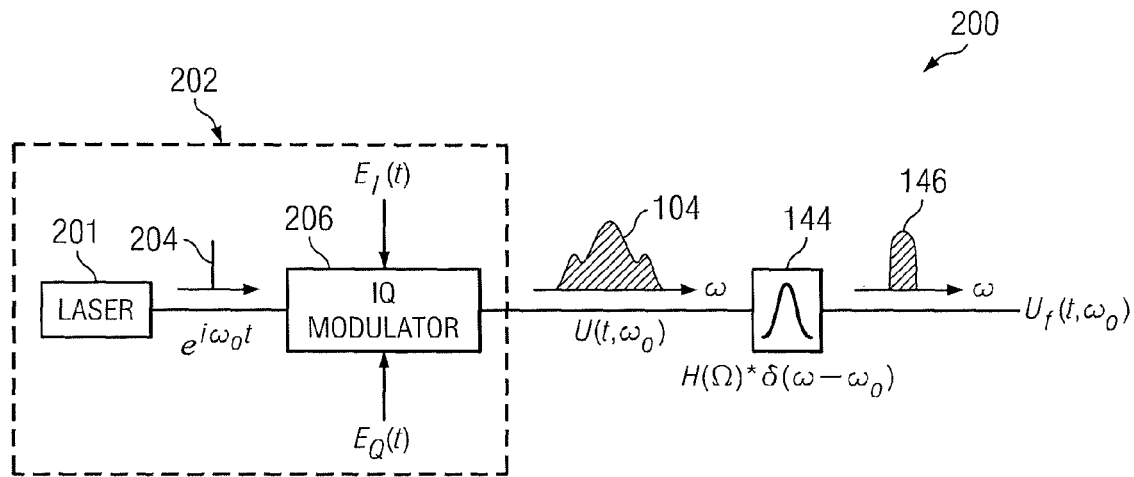
FIG. 2A illustrates a portion of an example optical node for colorless add of signals with optical-domain signal shaping in an optical network, in accordance with certain embodiments of the present disclosure.
Figure 2B:
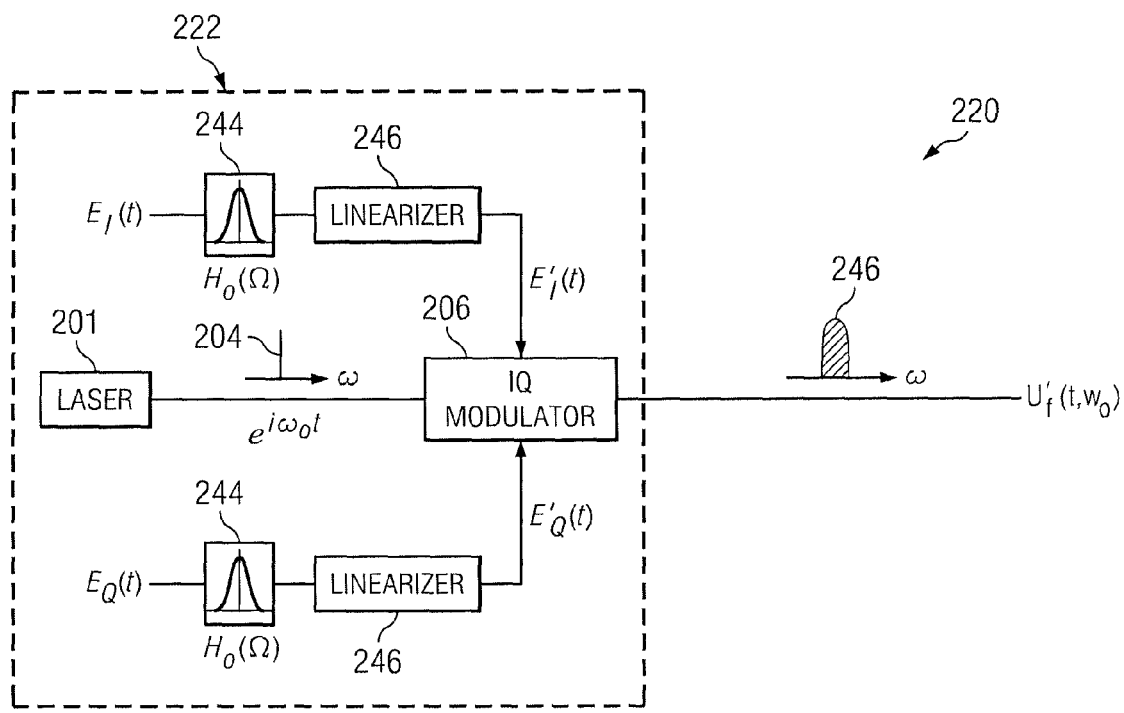
FIG. 2B illustrates a portion of an example optical node for colorless add of signals with electrical-domain signal shaping in an optical network, in accordance with certain embodiments of the present disclosure.

FIGS. 2A and 2B illustrate, respectively, portions of example optical node 200 and example optical node 220. Optical node 200 may include a transmitter 202 and an optical filter 144. Transmitter 202 may be identical or similar to transmitters 102 of FIGS. 1A-1C, and may include any transmitter or other suitable device configured to transmit optical signals. Transmitter 202 may be configured to receive information and transmit a modulated optical signal at a certain wavelength. As mentioned above, a wavelength of light may also be referred to as a channel. Transmitter 202 may also be configured to transmit this optically encoded information on the associated wavelength.

As depicted in FIG. 2A, transmitter may include a laser 201 and an IQ modulator 206. Laser 201 may be any system, device, or apparatus configured to emit a signal 204 of electromagnetic energy.

IQ modulator 206 may include any suitable modulator or other suitable device configured to perform quadrature amplitude modulation on an optical carrier signal (e.g., optical signal 204) to produce a modulated signal (e.g., optical signal 104) at its output. IQ modulator 206 may produce a modulated output signal 104 based on electrical input signals $E_I(t)$ and $E_Q(t)$ input to IQ modulator, as is known in the art. The modulated output signal 104 may then be filtered by optical filter 144 to produce a filtered optical signal 146, in a manner similar to that depicted in FIG. 1C.

The electrical input signals $E_I(t)$ and $E_Q(t)$, which are input to IQ modulator 206, may be expressed in the time domain as components of a complex signal $\overline{E}(t)$, such that $\overline{E}(t)=(E_I(t)+iE_Q(t))$. Optical carrier signal 204 may be expressed in the time domain as $e^{i\omega_0 t}$. Accordingly, IQ modulator 206 may output modulated output signal 104, which may also be expressed as $U(t, \omega_0)$, such that:

$$U(t,\omega_0)=(E_I(t)+iE_Q(t))e^{i\omega_0 t}$$

Converting to the frequency domain:

$$U(\Omega,\omega_0)=\overline{\epsilon}(\Omega)*\delta(\Omega-\omega_0)=(\overline{\epsilon}_I(\omega)+i\overline{\epsilon}_Q(\Omega))*\delta(\Omega-\omega_0)$$

where $\overline{\epsilon}_I$ and $\overline{\epsilon}_Q$ are inphase and quadrature phase parts of electrical input signals in the frequency domain and $\Omega$ is slowly varying frequency.

In the frequency domain, optical filter with linear phase response 144 may be expressed mathematically as:

$$H(\Omega,\omega_0)=H_0(\Omega)e^{i2\pi a\Omega}*\delta(\Omega-\omega_0)$$

where $H_0$ is real and symmetric.

Thus, the filtered optical signal 146 may be mathematically expressed as:

$$U_f(\Omega, \omega_0) = (H_0(\Omega)e^{i2\pi a\Omega}\overline{\epsilon}(\Omega)) * \delta(\Omega - \omega_0)$$
$$= (H_0(\Omega)e^{i2\pi a\Omega}\overline{\epsilon}_I(\Omega) + iH_0(\Omega)e^{i2\pi a\Omega}\overline{\epsilon}_Q(\Omega)) * \delta(\Omega - \omega_0)$$

In the time domain:

$$U_f(t,\omega_0)=(h(t+a)*E_I(t)+ih(t+a)*E_Q(t))e^{i\omega_0 t}$$

where h(t+a) is the impulse response of the filter $H_0(\Omega)e^{i2\pi a\Omega}$.

Notably, if the inphase and quadrature electrical signals $E_I(t)$ and $E_Q(t)$ are each filtered by the filters with impulse response h(t+a) prior to being communicated to IQ modulator 206, and optical filter 144 is removed, a signal similar to filtered optical signal 146 should be expected from the output of IQ modulator 206, as shown below in FIG. 2B.

FIG. 2B illustrates a portion of an optical node 220 having a transmitter 222. Transmitter 222 may be identical or similar to transmitter 202 of FIG. 2A (except as described below), and may include any transmitter or other suitable device configured to transmit optical signals. Transmitter 222 may be configured to receive information and transmit a modulated optical signal at a certain wavelength. As mentioned above, a wavelength of light may also be referred to as a channel. Transmitter 222 may also be configured to transmit this optically encoded information on the associated wavelength.

As depicted in FIG. 2B, transmitter may include a laser 201, an IQ modulator 206, one or more electrical low pass filters 244, and one or more linearizers 246. Laser 201 may be similar or identical to laser 201 of FIG. 2A, and IQ modulator 206 may be similar or identical to IQ modulator 20 of FIG. 2A.

Each electrical low pass filter 244 may include any system, device or apparatus configured to pass low-frequency electrical signals while attenuating high-frequency electrical signals. In come embodiments, one or more of electrical low pass filters may include a baseband electrical low pass filter. As shown in FIG. 2B, the electrical low pass filters 244 may be coupled to the signal inputs of IQ modulator 206 such that the signal inputs $E_I(t)$ and $E_Q(t)$ are filtered by the electrical low pass filters 244.

Each linearizer 246 may include any system, device, or apparatus configured to compensate for non-linear distortion introduced into optical system 220 (e.g., distortion introduced by non-ideal properties of IQ modulator 206). As shown in FIG. 2B, linearizers 246 may be coupled between low pass filters 244 and carrier signal inputs of IQ modulator 206. In certain embodiments, linearizers 246 may not be present (e.g., if IQ modulator 206 has substantially linear properties then linearizer 246 may not be particularly useful).

As shown in FIG. 2B, signal inputs $E_I(t)$ and $E_Q(t)$ may be filtered by the electrical low pass filters 244 with the same impulse response as optical filter 144 to produce signals $E_I'(t)$ and $E_Q'(t)$ to be input to IQ modulator 206 such that, in the time domain:

$$E_I'(t)=h(t)*E_I(t); \text{ and}$$

$$E_Q'(t)=h(t)*E_Q(t)$$

With such electrical signal inputs, IQ modulator 206 may output a filtered optical signal 246 that may be expressed in the time domain as:

$$U_f'(t, \omega_0) = (E_I'(t) + iE_Q'(t))e^{i\omega_0 t}$$
$$= (h(t) * E_I(t) + ih(t) * E_Q(t))e^{i\omega_0 t}$$

In optical spectrum domain, the above equation becomes:

$$U_f'(\Omega,\omega_0)=(H_0(\Omega)\overline{\epsilon}_I(\Omega)+iH_0(\Omega)\overline{\epsilon}_Q(\Omega))*\delta(\Omega-\omega_0)$$

which, except for a phase shift represented by the variable a, is substantially identical to filtered optical signal 146 shown in FIG. 2A. As a result, the optical power spectrum of optical signal 146 and that of optical signal 246 will be approximately the same. Accordingly, by adding electrical-domain filters as signal inputs to an IQ modulator of a transmitter, modulated optical signal may be shaped to reduce crosstalk without the need for optical filters at the output of the transmitter in colorless networks.

A component of optical nodes 100, 120, 140, 200, and 220 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to optical nodes 100, 120, 140, 200, and 220 without departing from the scope of the disclosure. The components of optical nodes 100, 120, 140, 200, and 220 may be integrated or separated. Moreover, the operations of optical nodes 100, 120, 140, 200, and 220 may be performed by more, fewer, or other components. Additionally, operations of optical nodes 100, 120, 140, 200, and 220 may be performed using any suitable logic. As used in this document, "each" refers to each member of a set or each member of a subset of a set.

Although the present invention has been described with several embodiments, various changes and modifications may be suggested to one skilled in the art. It is intended that the present invention encompass such changes and modifications as fall within the scope of the appended claims.

What is claimed is:

1. A method for optical signal shaping comprising:
   replacing an optical multiplexer with an optical coupler;
   filtering a first input signal using a first electrical filter to produce a first filtered input signal;
   filtering a second input signal using a second electrical filter to produce a second filtered input signal;
   modulating an optical carrier signal to output a modulated optical signal based on the first filtered input signal and the second filtered input signal,
   wherein the first electrical filter and the second electrical filter have the same impulse response as the optical multiplexer such that the modulated optical signal is filtered in the same manner as an optical signal output from the replaced optical multiplexer; and
   communicating the modulated optical signal to the optical coupler.

2. A method according to claim 1, wherein modulating the optical carrier signal includes performing IQ modulation on the optical signal based on the first filtered input signal and the second filtered input signal.

3. A method according to claim 1, wherein filtering the first input signal includes low pass filtering the first input signal.

4. A method according to claim 1, wherein each of the filtering the first input signal and filtering the second input signal includes filtering with a filter having approximately the same impulse response.

5. A method according to claim 1, wherein at least one filtering the first input signal and filtering the second input signal includes filtering with a filter having an impulse response approximately equal to a hypothetical optical filter configured to cause the modulated optical signal to be shaped such that side lobes are removed from the modulated optical signal.

6. A method according to claim 1, including linearizing at least one of the first filtered input signal and the second filtered input signal.

* * * * *